United States Patent
Gutalj et al.

(10) Patent No.: US 7,982,143 B2
(45) Date of Patent: Jul. 19, 2011

(54) ELECTRIC SWITCH HAVING AN ANNULAR STATIONARY CONTACT

(75) Inventors: Vladimir Gutalj, Oberentfelden (CH); Hugo Hiltbrunner, Vicques (CH)

(73) Assignee: Areva T & D AG, Oberentfelden (CH)

( * ) Notice: Subject to any disclaimer, the term of this patent is extended or adjusted under 35 U.S.C. 154(b) by 773 days.

(21) Appl. No.: 11/921,345

(22) PCT Filed: Jun. 9, 2006

(86) PCT No.: PCT/EP2006/063058
§ 371 (c)(1),
(2), (4) Date: Nov. 30, 2007

(87) PCT Pub. No.: WO2006/131560
PCT Pub. Date: Dec. 14, 2006

(65) Prior Publication Data
US 2009/0133996 A1    May 28, 2009

(30) Foreign Application Priority Data
Jun. 10, 2005    (FR) ...................................... 05 51572

(51) Int. Cl.
*H01H 33/00*    (2006.01)
(52) U.S. Cl. ........................... 200/48 R; 218/79; 218/55
(58) Field of Classification Search .................. 218/2–7, 218/13, 14, 43–45, 67–70, 75–80, 84, 140, 218/153, 154; 200/48 R
See application file for complete search history.

(56) References Cited

U.S. PATENT DOCUMENTS

| 3,665,135 | A | | 5/1972 | Boersma et al. | 200/163 |
| 5,955,715 | A | * | 9/1999 | Perret | 218/43 |
| 6,559,403 | B2 | * | 5/2003 | Gutalj | 218/79 |
| 6,946,613 | B2 | * | 9/2005 | Otsuka et al. | 218/79 |
| 7,429,710 | B2 | * | 9/2008 | Gutalj et al. | 218/79 |

FOREIGN PATENT DOCUMENTS

| FR | 1543152 | 10/1968 |
| GB | 1329725 | 9/1970 |
| WO | 99/52119 | 10/1999 |
| WO | 2005/018066 A2 | 2/2005 |

OTHER PUBLICATIONS

French Preliminary Search Report, FA 666588—FR 0551572 (Jan. 21, 2006) pp. 2.

* cited by examiner

*Primary Examiner* — Renee Luebke
*Assistant Examiner* — Marina Fishman
(74) *Attorney, Agent, or Firm* — Nixon Peabody LLP

(57) ABSTRACT

An electric switch including a stationary contact that is annular. The switch comprises a gastight enclosure, a conductor bar of axis (D), a stationary contact presenting a contact zone of substantially annular shape, a switch element, e.g. on the conductor bar, that is movable in the axial direction of the axis (D) between a first position in which it penetrates in part into the stationary contact to establish electrical contact between the conductor bar and the stationary contact, and a second position in which it interrupts said contact. The stationary contact, which is in the form of a ring that is circular or elongate, such as elliptical, surrounds the conductor bar, at least in part.

8 Claims, 2 Drawing Sheets

ELECTRIC SWITCH HAVING AN ANNULAR STATIONARY CONTACT

CROSS REFERENCE TO RELATED APPLICATIONS OR PRIORITY CLAIM

This application is a national phase of International Application No. PCT/EP2006/063058 entitled "An Electric Switch Having an Annular Stationary Contact", which was filed on Jun. 9, 2006, and which claims priority of French Patent Application No. 05 51572, filed Jun. 10, 2005.

TECHNICAL FIELD

The invention relates to an electric switch having an annular stationary contact.

More precisely, the invention relates to an electric switch element comprising a stationary conductor bar having an axis (D) connected to a medium or a high potential, a grounded stationary contact presenting a contact zone of substantially annular shape, a switch contact slidably mounted on the conductor bar between a first position in which it penetrates into the stationary contact to establish electrical contact between the conductor bar and the stationary contact, and a second position in which it interrupts said contact.

The invention also relates to a switch comprising a casing closed in gastight manner in order to be filled with a dielectrically insulating gas, and including one or more switch elements of the invention.

Finally, the invention relates to a stationary contact for a switch of the invention.

BACKGROUND

A switch of this type is already known (U.S. Pat. No. 3,665,135). It comprises a casing connected to ground and a conductor support mounted in the casing via an insulator. Two switch elements are mounted in the conductor support, perpendicularly to each other. These switch elements enable two conductor bars that are likewise perpendicular to each other to be interconnected. One of the conductor bars may also be grounded.

Also known (GB 1 329 725) is a high voltage electrical disconnector having three switch positions, including a grounding position. Two conductor bars situated in line with each other are connected to a casing that is closed in gastight manner. A switch element is mounted perpendicularly to the conductor bars. The element moves between a first position in which the two conductor bars are connected to each other, and a grounding position in which one of the conductor bars is grounded. In an intermediate, third position, the contact is open. In that device, the clearance is perpendicular to the travel axis of the switch element. Nevertheless, the stationary contact is not substantially annular in shape.

Also known (WO 2005/018066) is an electric switch comprising a switch element having a contact finger parallel to a travel direction of the switch element.

The document FR 1 543 152 discloses a switch with ring shaped fixed contacts and with a longitudinally movable commutation rod able to make contact between the fixed contacts. A contact is arranged in the axis of the commutation rod and a fixed contact encircles the communication rod. A semi movable contact arranged on an insulating tube encircles the rod and makes contact to the fixed ring shaped contact from the inside. However, for switching an additional commutation rod is needed. The insulating tube itself is not able to make a complete switching function.

The U.S. Pat. No. 5,955,715 discloses a circuit breaker with a first ring shaped fixed contact and a first ring shaped movable contact able to make contact and to separate depending on the position, the fixed contact being arranged on the axis of the movable contact; with a second ring shaped fixed contact and a movable commutation rod able to make contact and to separate, depending on the position, the fixed contact being arranged on the axis of the movable commutation rod; and with a third ring shaped fixed arcing contact and a semi moving block with a third ring shaped arcing contact able to make contact and to separate, depending the position. The semi moving block is sliding on the metal conductor rod. The third ring shaped contact encircles the metal conductor rod.

SUMMARY

The devices described above are bulky. In addition, they are relatively complex to make. The present invention seeks to provide a switch that remedies those drawbacks while providing a reduction in cost and size by means of a casing of simplified shape. In accordance with the invention, these objects are achieved by the fact that the stationary contact surrounds externally the conductor bar, at least in part.

Advantageously, spring contacts are provided on the switch element or on the stationary contact. In a particular embodiment, the stationary contact is in the form of a ring that is circular or elongate, which ring may be elliptical or egg-shaped, for example.

In a particular embodiment, the stationary contact presents the form of a sector surrounding the conductor bar in part, and the switch contact is in the form of a sector corresponding to the sector of the stationary contact.

Advantageously, the switch is fitted with a second conductor bar to which the switch contact can be connected in a third position.

The invention also provides a switch comprising a casing that is closed in gastight manner and filled with an insulating gas, the casing containing one or more switch elements in accordance with the invention.

BRIEF DESCRIPTION OF THE DRAWINGS

Other characteristics and advantages of the invention appear further on reading the following description of an embodiment given by way of illustration and with reference to the accompanying figures. In the figures.

DETAILED DESCRIPTION

Figure 1:
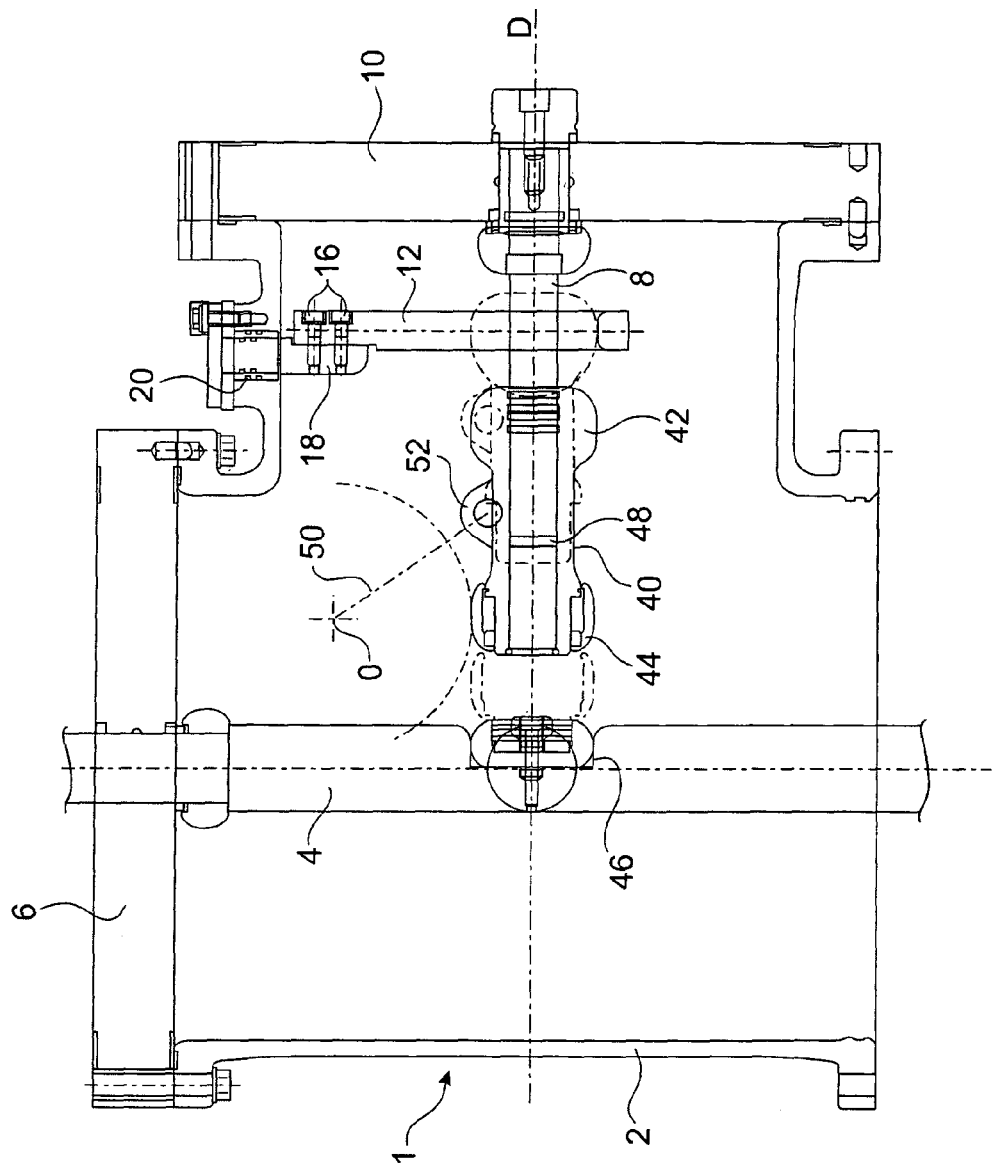
FIG. 1 is a general section view of a switch in accordance with the present invention.

In FIG. 1, the switch given overall reference 1 comprises a casing 2 that is generally made of metal and cylindrical in shape. The casing is closed in gastight manner. It is filled with a dielectrically insulating gas such as $SF_6$ at a pressure of a few bars.

A conductor bar 4 passes through an insulating plate 6, and a conductor bar 8, perpendicular to the bar 4, passes through an insulating plate 10. The conductor bar 4 carries on through the disconnector, whereas, on the contrary, the other conductor bar 8 presents a free end spaced apart from the conductor bar 4 by a dielectric insulation distance. The conductor bar 8 is connected to a high potential.

The conductor bars 4 and 8 constitute one phase of the disconnector. Naturally, in a three-phase disconnector, there are three identical phases.

Figure 3:
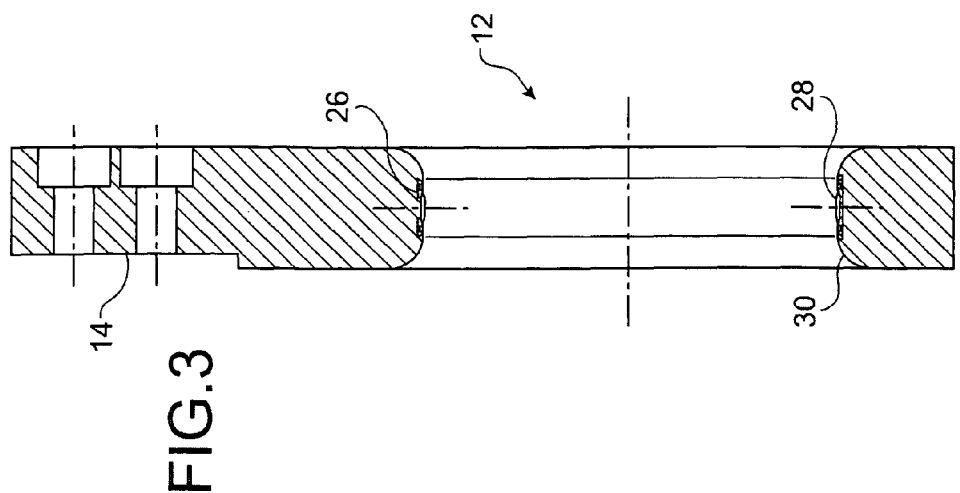
FIG. 3 is a section view of the same stationary contact.
Figure 2:
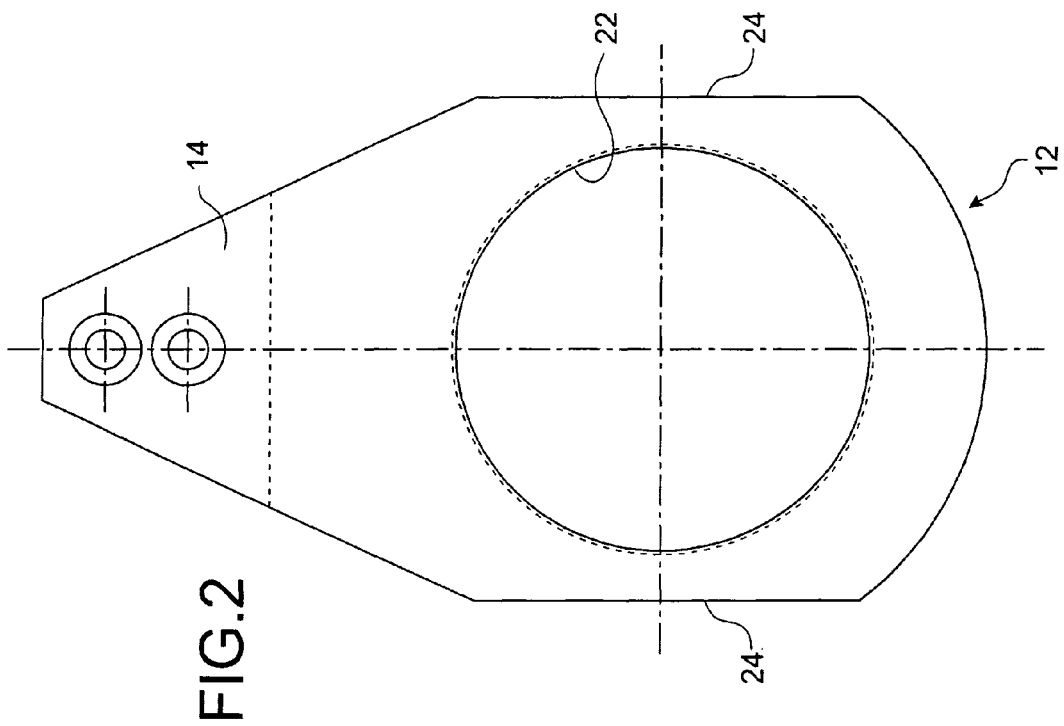
FIG. 2 is a face view of a stationary contact forming part of the switch of FIG. 1.

The disconnector has a stationary contact 12. As can be seen more particularly in FIGS. 2 and 3, the stationary contact 12 presents a fastener section 14 enabling it to be fastened via two screws 16 to a support 18 connected to the casing 2 via an insulator 20. The stationary contact is connected to ground potential either directly or via measuring equipment. As can be seen more particularly in FIG. 2, the stationary contact and the circular contact zone 22 constitute a contact that is annular in shape. In the example shown, the contact zone 22 is accurately circular. Nevertheless, in a variant embodiment, it could present a shape that is elongate in order to reduce the width of the stationary contact. For the same reasons of reducing width, the stationary contact 12 has two flats 24 which also serve to reduce its overall size. A groove 26 is formed in the annular zone 22 and a spring blade 28 is inserted in the groove 26. Finally, it should be observed (FIG. 3) that the contact zone 22 presents rounded edges 30 so as to reduce electric field intensity. In accordance with the main characteristic of the invention, the conductor bar 8 passes through the contact zone 22. A switch element 40 is mounted on the free end of the conductor bar 8. In the example described, the switch element 40 is movable between three positions. In a first position shown in solid lines in FIG. 1, the disconnector is an open position. In this position, the switch element is in contact neither with the conductor bar 4 nor with the stationary contact 12.

In a second position, referred to as a "grounding" position, the switch element 40 penetrates in part into the inside of the contact zone 22, as shown in dashed lines in FIG. 1, to the right of the switch element. For this purpose, the switch element 40 presents a collar 42 that is slightly smaller in diameter than the inside of the annular contact zone 22 of the stationary contact element 12. The spring blades 28 provide good contact between the periphery of the collar 42 and the stationary contact 12.

In a third position, referred to as the "switched" position or the "closed" position, the switch element establishes contact between the conductor bar 4 and the conductor bar 8. In this position, its front end 44 penetrates into an orifice 46 formed in the first conductor bar 4. Advantageously, the contact orifice 46 is also provided with spring blades to ensure good contact between the two parts. A guide strip 48 guides the switch element on the conductor bar 8. Electrical contact between the switch element 40 and the conductor bar 8 is provided by spring blades 49. The switch element 40 is caused to move between these three positions by any appropriate means, for example a control lever represented diagrammatically at 50 by a chain-dotted line. The lever 50 pivots about a point O. It is connected to a lug 52 on the switch element. In the embodiment described, the contact zone presents a closed shape completely surrounding the conductor bar 8. Nevertheless, in a variant embodiment, the contact zone could present merely the shape of a sector of a circular arc surrounding in part a collar that is likewise in the form of a sector corresponding to the sector of the switch element 40.

What is claimed is:

1. An electric switch element comprising:
   a stationary conductor bar having an axis (D), connected to a medium or a high potential;
   a stationary grounded contact presenting a contact zone of substantially annular shape;
   a switch contact slidably mounted on the conductor bar between a first position in which the switch contact penetrates into the stationary grounded contact to establish electrical contact between the conductor bar and the stationary grounded contact, and a second position in which the switch contact interrupts said stationary grounded contact, wherein the stationary grounded contact completely surrounds an external surface of the conductor bar.

2. A switch element according to claim 1, characterized in that
   spring contacts are provided on the switch element or on the stationary grounded contact.

3. A switch element according to claim 1, characterized in that the stationary contact is in the form of a ring that is circular or elongate.

4. A switch element according to claim 1, characterized in that it is fitted with a second conductor bar to which the switch contact can be connected in a third position.

5. A switch according to claim 1, comprising a casing closed in gastight manner and filled with a dielectrically insulating gas, the switch including said one or more switch elements.

6. A switch according to claim 5 having the stationary grounded contact.

7. A switch element according to claim 1, characterized in that the stationary contact is in the form of a ring that is elliptical in shape.

8. An electric switch element comprising:
   a stationary conductor bar having an axis (D), connected to a medium or a high potential;
   a stationary grounded contact presenting a contact zone of substantially annular shape, wherein the contact zone is coaxial with the axis D;
   a switch contact slidably mounted on the conductor bar between a first position in which the switch contact penetrates into the stationary grounded contact to establish electrical contact between the conductor bar and the stationary grounded contact, and a second position in which the switch contact interrupts said stationary grounded contact, wherein the stationary grounded contact at least partially surrounds an external surface of the conductor bar.

* * * * *